US009765623B2

(12) United States Patent
Kottilingam et al.

(10) Patent No.: US 9,765,623 B2
(45) Date of Patent: Sep. 19, 2017

(54) METHODS FOR MODIFYING COOLING HOLES WITH RECESS-SHAPED MODIFICATIONS

(71) Applicant: General Electric Company, Schenectady, NY (US)

(72) Inventors: Srikanth Chandrudu Kottilingam, Simpsonville, SC (US); Yan Cui, Greer, SC (US); Brian Lee Tollison, Honea Path, SC (US); David Edward Schick, Greenville, SC (US); Jonathan Matthew Lomas, Simpsonville, SC (US); Gareth William David Lewis, Greenville, SC (US)

(73) Assignee: General Electric Company, Schenectady, NY (US)

( * ) Notice: Subject to any disclaimer, the term of this patent is extended or adjusted under 35 U.S.C. 154(b) by 1252 days.

(21) Appl. No.: 13/948,240

(22) Filed: Jul. 23, 2013

(65) Prior Publication Data

US 2015/0030460 A1   Jan. 29, 2015

(51) Int. Cl.
*F01D 5/00* (2006.01)
*B23P 6/00* (2006.01)
*F01D 5/18* (2006.01)

(52) U.S. Cl.
CPC .............. *F01D 5/005* (2013.01); *B23P 6/005* (2013.01); *F01D 5/182* (2013.01); *F01D 5/186* (2013.01);
(Continued)

(58) Field of Classification Search
CPC .......... F01D 5/005; F01D 5/187; F01D 5/186; F01D 5/182; B23P 6/005; B23P 2700/06;
(Continued)

(56) References Cited

U.S. PATENT DOCUMENTS

| 4,390,320 A | 6/1983 | Eiswerth |
| 4,411,597 A | 10/1983 | Koffel et al. |

(Continued)

FOREIGN PATENT DOCUMENTS

| EP | 1245691 A2 | 10/2002 |
| EP | 1245691 A3 | 11/2002 |

(Continued)

OTHER PUBLICATIONS

English Machine Translation of JP3957214(B2) published Aug. 15, 2007 (also published as WO03048528A1).*

(Continued)

*Primary Examiner* — Sarang Afzali
(74) *Attorney, Agent, or Firm* — Ernest G. Cusick; Frank A. Landgraff

(57) ABSTRACT

A Method for modifying a plurality of cooling holes of a turbine component includes disposing a recess-shaped modification in a recess of the component comprising a plurality of cooling hole outlets, wherein the recess-shaped modification is formed to substantially fill the recess and comprising a plurality of modified cooling holes passing there through. The method further includes aligning the plurality of modified cooling holes of the recess-shaped modification with the plurality of cooling hole outlets of the component, inserting at least one alignment pin into at least one of aligned pair of holes and hole outlets, bonding the recess-shaped modification disposed in the recess to the component, and removing the at least one alignment pin after bonding, wherein the plurality of modified cooling holes of the recess-shaped modification is fluidly connected with the plurality of cooling holes of the component.

6 Claims, 4 Drawing Sheets

(52) U.S. Cl.
CPC .......... *F01D 5/187* (2013.01); *B23P 2700/06* (2013.01); *F05D 2230/22* (2013.01); *F05D 2230/236* (2013.01); *F05D 2230/80* (2013.01); *F05D 2240/307* (2013.01); *Y02T 50/671* (2013.01); *Y02T 50/676* (2013.01); *Y10T 29/49318* (2015.01); *Y10T 29/49737* (2015.01); *Y10T 29/49902* (2015.01)

(58) Field of Classification Search
CPC . Y02T 50/676; Y02T 50/671; F05D 2230/22; F05D 2230/236; F05D 2230/80; F05D 2240/307; Y10T 29/49318; Y10T 29/49718; Y10T 29/49732; Y10T 29/49734; Y10T 29/49735; Y10T 29/49341; Y10T 29/49895; Y10T 29/49737

See application file for complete search history.

(56) References Cited

U.S. PATENT DOCUMENTS

| | | |
|---|---|---|
| 4,540,339 A | 9/1985 | Horvath |
| 4,726,104 A | 2/1988 | Foster et al. |
| 5,826,332 A * | 10/1998 | Bichon ................ B21D 26/055 228/118 |
| 5,836,075 A | 11/1998 | Fitzgerald et al. |
| 6,234,755 B1 | 5/2001 | Bunker et al. |
| 6,265,022 B1 | 7/2001 | Fernihough et al. |
| 6,569,492 B2 | 5/2003 | Fernihough et al. |
| 7,278,828 B2 * | 10/2007 | Steplewski ............. B23P 6/005 29/888.024 |
| 7,484,928 B2 | 2/2009 | Arness et al. |
| 8,087,565 B2 | 1/2012 | Kottilingam et al. |
| 8,267,662 B2 * | 9/2012 | Patrick ...................... F01D 5/26 416/146 R |
| 2002/0197152 A1 * | 12/2002 | Jackson ................. B23P 6/005 415/115 |
| 2007/0172351 A1 | 7/2007 | Arness et al. |
| 2010/0008778 A1 * | 1/2010 | Patrick ...................... F01D 5/26 416/144 |
| 2010/0239409 A1 * | 9/2010 | Draper .................... F01D 5/005 415/1 |
| 2012/0052200 A1 | 3/2012 | Zimmerman |
| 2012/0156020 A1 | 6/2012 | Kottilingam et al. |
| 2012/0308843 A1 * | 12/2012 | Ott ....................... B23K 1/0018 428/614 |
| 2012/0328451 A1 * | 12/2012 | Lomas .................... F01D 5/187 416/97 R |

FOREIGN PATENT DOCUMENTS

| | | |
|---|---|---|
| EP | 2230381 A2 | 9/2010 |
| EP | 2540971 A1 | 1/2013 |
| JP | 2009041449 A | 2/2009 |
| WO | 03048528 A1 | 6/2003 |

OTHER PUBLICATIONS

European Search Report and Opinion issued in connection with corresponding EP Application No. 14177404.2 on Feb. 10, 2015.

* cited by examiner

METHODS FOR MODIFYING COOLING HOLES WITH RECESS-SHAPED MODIFICATIONS

BACKGROUND OF THE INVENTION

The subject matter disclosed herein relates to cooling holes and, more specifically, to modifying cooling holes for turbine components.

In gas turbine engines, such as aircraft engines or heavy duty gas turbines for example, air is drawn into the front of the engine, compressed by a shaft-mounted rotary-type compressor, and mixed with fuel. The mixture is burned, and the hot exhaust gases are passed through a turbine mounted on a shaft. The flow of gas turns the turbine, which turns the shaft and drives the compressor and fan. The hot exhaust gases flow from the back of the engine, driving it and the aircraft forward.

During operation of gas turbine engines, the temperatures of combustion gases may exceed 3,000° F., considerably higher than the melting temperatures of the metal parts of the engine which are in contact with these gases. Operation of these engines at gas temperatures that are above the metal part melting temperatures is a well-established art, and depends in part on supplying a cooling air to the outer surfaces of the metal parts through various methods. The metal parts of these engines that are particularly subject to high temperatures, and thus require particular attention with respect to cooling, are the metal parts forming combustors and parts located aft of the combustor, in the so-called "hot gas path". For example, the operating temperatures can be partially regulated by using passageways such as cooling holes incorporated into some engine components such as buckets.

Superalloys, such as precipitation-hardenable Ni-based superalloys, or Co-based superalloys, can be used for turbine components to help withstand higher operating temperatures. However, the modification of these materials, particularly around cooling holes (e.g., proximate the tip of a bucket), may also require significant resources such as for properly preheating and/or cooling weld repair sites, removing original material, building up new material, and finishing any final surfaces into compliance ranges. As a result, modifying cooling holes through welding/brazing can require additional resources and time to allow for sufficient joining of additional material.

Accordingly, alternative methods for modifying cooling holes would be welcome in the art.

BRIEF DESCRIPTION OF THE INVENTION

In one embodiment, a method is disclosed for modifying a plurality of cooling holes of a component. The method includes disposing a recess-shaped modification in a recess of the component comprising a plurality of cooling hole outlets, the recess-shaped modification formed to substantially fill the recess and comprising a plurality of modified cooling holes passing there through. The method further includes aligning the plurality of modified cooling holes of the recess-shaped modification with the plurality of cooling hole outlets of the component, and, bonding the recess-shaped modification disposed in the recess to the component, wherein the plurality of modified cooling holes of the recess-shaped modification is fluidly connected with the plurality of cooling holes of the component.

In another embodiment, another method for modifying a plurality of cooling holes of a component is disclosed. The method includes disposing a recess-shaped modification in a recess of the component comprising a plurality of cooling hole outlets, the recess-shaped modification formed to substantially fill the recess. The method further includes forming a plurality of modified cooling holes through the recess-shaped modification that align with the plurality of cooling hole outlets of the component, and, bonding the recess-shaped modification in the recess to the component, wherein the plurality of modified cooling holes of the recess-shaped modification is fluidly connected with the plurality of cooling holes of the component.

In yet another embodiment, a modified component in disclosed. The modified component includes an original component base comprising a plurality of cooling holes therein, the plurality of cooling holes having a plurality of cooling hole outlets at a recess. The modified component further includes a recess-shaped modification disposed in the recess and comprising a plurality of modified cooling holes that align with the plurality of cooling hole outlets of the original component base, and wherein, the recess-shaped modification is bonded to the original component base such that the plurality of modified cooling holes of the recess-shaped modification is fluidly connected with the plurality of cooling holes of the original component base.

These and additional features provided by the embodiments discussed herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the inventions defined by the claims. The following detailed description of the illustrative embodiments can be understood when read in conjunction with the following drawings, where like structure is indicated with like reference numerals and in which:

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is generally applicable to components that operate within environments characterized by relatively high temperatures, and particularly a component whose maximum surface temperature approaches the melting temperature of the material from which it is formed, necessitating the use of forced air cooling to reduce the component surface temperature. Notable examples of such components include the high and low pressure turbine buckets (blades), nozzles (vanes), shrouds, and other hot gas path components of a turbine, such as an industrial or aircraft gas turbine engine.

Figure 1:
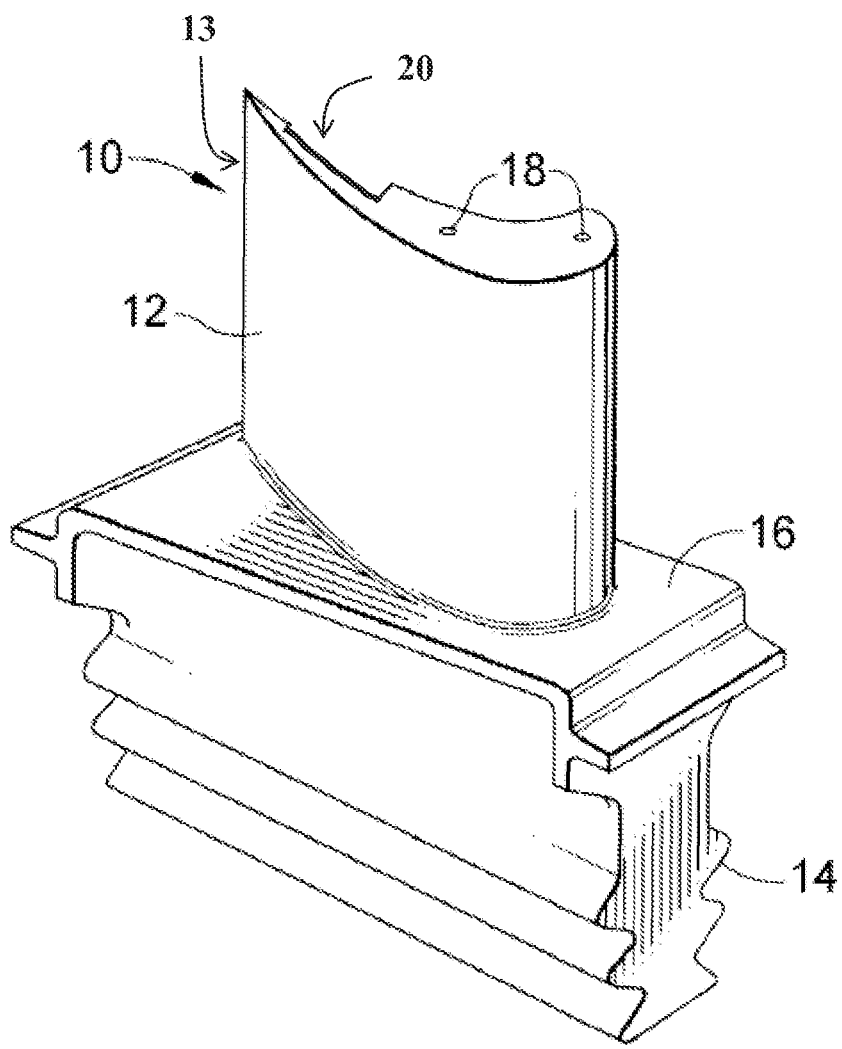
FIG. 1 is a perspective view of a component having a recess according to one or more embodiments shown or described herein.
Figure 2:
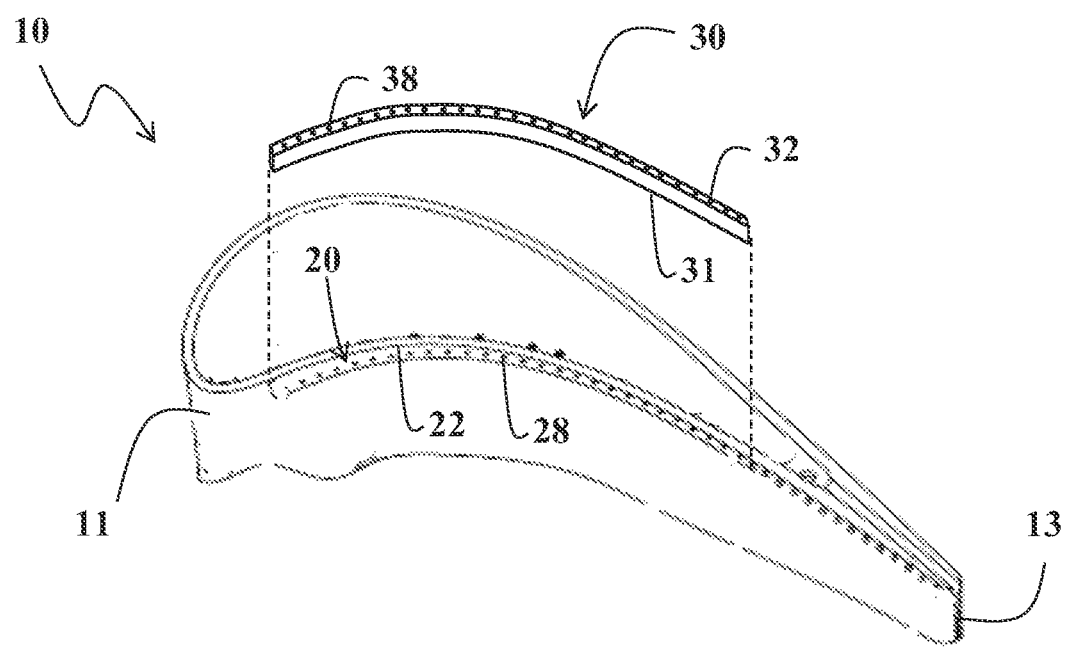
FIG. 2 is an exploded view of a recess-shaped modification filling a recess of a component according to one or more embodiments shown or described herein.

Referring now to FIGS. 1 and 2, an exemplary modified component 10 is illustrated comprising a turbine bucket. The modified component 10 generally includes an airfoil 12 against which hot combustion gases are directed during operation of the gas turbine engine, and whose surface is therefore subjected to very high temperatures. The airfoil 12 is represented as configured to be anchored to a turbine disk (not shown) with a dovetail 14 formed on a root section of the modified component 10 that is separated from the airfoil 12 by a platform 16. The airfoil 12 includes internal cooling passages 18 (e.g., cooling holes) through which bleed air that enters the modified component 10 through its root section is forced to transfer heat from the modified component 10. As will become appreciated herein, the modified component 10 further comprises a recess-shaped modification 30 that fills a previously formed recess to modify the cooling holes 18. This recess-shaped modification 30 may allow for distress and/or oxidation at the cooling holes 18 to be removed by forming the recess, while subsequently reforming the lost portion of the cooling holes 18 via the modified cooling holes 38 (i.e. new/replacement cooling hole portions) of the recess-shaped modification 30. Such embodiments can avoid having to build up via welding and/or brazing. While the advantages of this invention will be described with reference to the modified component 10 shown as a bucket in FIG. 1, the teachings of this invention are generally applicable to other hot gas path components of industrial and aircraft gas turbine engines, as well as a variety of other components that are subjected to extreme temperatures.

Referring now to FIG. 2, an exploded view of a modified component 10 is illustrated comprising an original component base 11 (also referred to simply as the "component") and a recess-shaped modification 30. As used herein, "original component base" refers to the bulk of the original component that is modified through the addition of the recess-shaped modification 30. "Original" only refers to relative state of the component prior to the modification discussed herein, and not necessarily a new-make component. For example, the "original component base" can refer to a turbine bucket that underwent several hours of operation and is now in need of modification (e.g., repair or maintenance).

The original component base 11 generally comprises a plurality of cooling holes 18 (i.e., an internal passage that facilitates the flow of a fluid medium such as air) that have cooling hole outlets 28. The cooling hole outlets 28 can be disposed at an outer surface 22 of the original component base 11. Specifically, the base component can have a recess 20 formed by removing an outer portion of the original component base 11 such that at least some of the cooling hole outlets 28 on the outer surface 22 are disposed within the recess 20. The recess 20 can comprise any suitable depth, width and other dimensions with respect to the original geometry of the original component base 11. For example, the cooling hole outlet 28 exposed by the removal of material when forming the recess 20, can comprise any previously internal portion of the internal cooling passageways including the portions more proximate the surface, or the more internal portions utilized to distribute cooling air. Such recesses can also be formed anywhere about the outer surface that can comprise one or more cooling hole outlets. For example, when the component comprises a turbine bucket, the plurality of cooling hole outlets 28 disposed in the recess 20 may be present at the bucket tip. In even some specific embodiments, the recess 20 may be formed adjacent the trailing edge 13 of the turbine bucket such that the recess-shaped modification 30 replaces a portion of the turbine bucket about its trailing edge 13. By removing the outer portion from the original component base 11 to form the recess 20, areas of oxidation, cracks and/or other forms of distress (such as those potentially originating around one or more cooling holes 18) may be removed.

The cooling holes 18 and the cooling hole outlets 28 can be disposed at any relative locations and comprise any configuration that assists in cooling the original component base 11 when in operation. For example, in some embodiments, the cooling holes 18 may comprise a serpentine configuration internal the original component base 11. In some embodiments, multiple cooling holes 18 may be interconnected.

The original component base 11 can comprise a variety of materials such as one or more superalloys. In some embodiments, the base article can comprise a nickel-, cobalt-, or iron-based superalloy. For example, the original component base 11 can comprise nickel-based superalloys such as René N4, René N5, René 108, GTD-111®, GTD-222®, GTD-444®, IN-738 and MarM 247 or cobalt-based superalloys such as FSX-414. The base component may be formed as an equiaxed, directionally solidified (DS), or single crystal (SX) casting to withstand the high temperatures and stresses to which it is subjected such as within a gas turbine engine.

Referring to FIGS. 1 and 2, the modified component 10 further comprises the recess-shaped modification 30. The recess-shaped modification 30 is shaped to substantially fill the recess 20 formed in the original component base 11 (i.e., the component). As used herein, "substantially fill" refers to the size, shape and overall profile of the recess-shaped modification 30 being substantially matched to the size, shape and profile of the recess 20. Thus, where the recess negatively removed an outer portion of material from the base component, the recess-shaped modification 30 positively provides material as a replacement so that the outer profile of the modified component 10 is substantially similar to the outer profile of the original component base 11 prior to the creation of the recess 20.

The recess-shaped modification 30 further comprises a plurality of modified cooling holes 38. The plurality of cooling holes pass from an interior surface 31 (the surface adjacent the original component base 11 once installed) to an exterior surface 32 (the surface that forms part of the exterior of the modified component 10). Similar to the cooling holes 18 of the original component base 11, the modified cooling holes 38 are internal passages that facilitate the flow of a fluid medium such as air. In some embodiments, the modified cooling holes 38 can have the same diameter, cross section and/or other dimensions as the cooling holes 18 of the base component. In other embodiments, one or more of said dimensions may vary such that a fluid may flow there between once fluidly connected as will become appreciated herein. These modified cooling holes 38 can thereby replace the portion of the cooling holes 18 of the original component base 11 that were removed when forming the recess 20. As such, any areas of oxidation, cracks and/or other forms of distress (such as those potentially originating around one or more cooling holes 18) may be replaced by the modified cooling holes 38 free of such distress.

The modified cooling holes 38 may be present in the recess-shaped modification 30 prior to disposing it in the recess 20, may be formed in the recess-shaped modification 30 once it is already disposed in the recess 20, or combinations thereof. For example, in some embodiments modified cooling holes 38 are formed in the manufacturing of the recess-shaped modification 30. In some embodiments, modified cooling holes 38 are machined (e.g., drilled) into the recess-shaped modification 30 post creation of the recess-shaped modification 30 but prior to disposing it in the recess 20. In even some embodiments, modified cooling holes 38 are machined (e.g., drilled) into the recess-shaped modification 30 is already disposed in the recess 20.

The recess-shaped modification 30 can comprise a variety of materials. For example, in some embodiments, the recess-shaped modification 30 can comprise a nickel-, cobalt-, or iron-based superalloy such as those discussed above. In even some of these embodiments, such as when the original component base 11 comprises a turbine bucket or other turbine component, the recess-shaped modification 30 and the original component base 11 may share a common composition (i.e., they are the same type of material).

In some embodiments, the recess-shaped modification 30 may comprise a pre-sintered preform. The pre-sintered preform comprises a mixture of particles comprising a base alloy and a second alloy that have been sintered together at a temperature below their melting points to form an agglomerate and somewhat porous mass. Suitable particle size ranges for the powder particles include 150 mesh, or even 325 mesh or smaller to promote rapid sintering of the particles and minimize porosity in the pre-sintered preform 30 to about 10 volume percent or less. In some embodiments, the density of the pre-sintered preform 30 has a density of 90% or better. In even some embodiments, the pre-sintered preform 30 has a density of 95% or better.

The base alloy of the pre-sintered preform can comprise any composition such as one similar to the original component base 11 to promote common physical properties between the pre-sintered preform recess-shaped modification 30 and the base component 20. For example, in some embodiments, the base alloy (of the pre-sintered preform) and the original component base 11 share a common composition (i.e., they are the same type of material). In some embodiments, the base alloy can comprise nickel-based superalloys such as René N4, René N5, René 108, GTD-111®, GTD-222®, GTD-444®, IN-738 and MarM 247 or cobalt-based superalloys such as FSX-414 as discussed above. In some embodiments, the properties for the base alloy include chemical and metallurgical compatibility with the original component base 11, such as high fatigue strength, low tendency for cracking, oxidation resistance and/or machinability.

In some embodiments, the base alloy may comprise a melting point of within about 25° C. of the melting temperature of the original component base 11. In some embodiments, the base alloy may comprise a compositional range of, by weight, about 2.5 to 11% cobalt, 7 to 9% chromium, 3.5 to 11% tungsten, 4.5 to 8% aluminum, 2.5 to 6% tantalum, 0.02 to 1.2% titanium, 0.1 to 1.8% hafnium, 0.1 to 0.8% molybdenum, 0.01 to 0.17% carbon, up to 0.08% zirconium, up to 0.60 silicon, up to 2.0 rhenium, the balance being nickel and incidental impurities. In even some embodiments, the base alloy may comprise a compositional range of, by weight, about 9 to 11% cobalt, 8 to 8.8% chromium, 9.5 to 10.5% tungsten, 5.3 to 5.7% aluminum, 2.8 to 2.3% tantalum, 0.9 to 1.2% titanium, 1.2 to 1.6% hafnium, 0.5 to 0.8% molybdenum, 0.13 to 0.17% carbon, 0.03 to 0.08% zirconium, the balance nickel and incidental impurities. It should be appreciated that while specific materials and compositions have been listed herein for the composition of the base alloy of the pre-sintered preform recess-shaped modification 30, these listed materials and compositions are exemplary only and non-limiting and other alloys may alternatively or additionally be used. Furthermore, it should be appreciated that the particular composition of the base alloy for the pre-sintered preform may depend on the composition of the original component base 11.

As discussed above, the pre-sintered preform further comprises a second alloy. The second alloy may also have a composition similar to the original component base 11 but further contain a melting point depressant to promote sintering of the base alloy and the second alloy particles and enable bonding of the pre-sintered preform recess-shaped modification 30 to the original component base 11 at temperatures below the melting point of the original component base 11. For example, in some embodiments the melting point depressant can comprise boron and/or silicon.

In some embodiments, the second alloy may comprise a melting point of about 25° C. to about 50° C. below the grain growth or incipient melting temperature of the original component base 11. Such embodiments may better preserve the desired microstructure of the original component base 11 during the heating process. In some embodiments, the second alloy may comprise a compositional range of, by weight, about 9 to 10% cobalt, 11 to 16% chromium, 3 to 4% aluminum, 2.25 to 2.75% tantalum, 1.5 to 3.0% boron, up to 5% silicon, up to 1.0% yttrium, the balance nickel and incidental impurities. For example, in some embodiments the second alloy may comprise commercially available Amdry DF4B nickel brazing alloy. It should also be appreciated that while specific materials and compositions have been listed herein for the composition of the second alloy of the pre-sintered preform recess-shaped modification 30, these listed materials and compositions are exemplary only and non-limiting and other alloys may alternatively or additionally be used. Furthermore, it should be appreciated that the particular composition of the second alloy for the pre-sintered preform recess-shaped modification 30 may depend on the composition of the original component base 11.

The pre-sintered preform can comprise any relative amounts of the base alloy and the second alloy that are sufficient to provide enough melting point depressant to ensure wetting and bonding (e.g., diffusion/brazing bonding) of the particles of the base alloy and the second alloy to each other and to the outer surface 22 of the original component base 11. For example, in some embodiments the second alloy can comprise at least about 10 weight percent of the pre-sintered preform. In some embodiments the second alloy can comprise no more than 70 weight percent of the pre-sintered preform. Such embodiments may provide a sufficient amount of melting point depressant while limiting potential reduction of the mechanical and environmental properties of the subsequent heating. Furthermore, in these embodiments, the base alloy can comprise the remainder of the pre-sintered preform (e.g., between about 30 weight percent and about 70 weight percent of the pre-sintered preform). In even some embodiments, the particles of the base alloy can comprise about 40 weight percent to about 70 weight percent of the pre-sintered preform with the balance of the composition comprising particles of the second alloy. It should be appreciated that while specific relative ranges of the base alloy and the second alloy have been presented herein, these ranges are exemplary only and non-limiting and any other relative compositions may also be realized such that a sufficient amount of melting point depressant is provided as discussed above.

Aside from the particles of the base alloy and the second alloy, no other constituents are required within the pre-sintered preform. However, in some embodiments, a binder may be initially blended with the particles of the base alloy and the second alloy to form a cohesive mass that can be more readily shaped prior to sintering. In such embodiments, the binder can include, for example, a binder commercially available under the name NICROBRAZ-S from the Wall Colmonoy Corporation. Other potentially suitable binders include NICROBRAZ 320, VITTA GEL from Vitta Corporation, and others including adhesives commercially available from Cotronics Corporation, all of which may volatilize cleanly during sintering.

The pre-sintered preform may be formed by mixing the powder particles of the base alloy (i.e., base alloy particles) and the second alloy (i.e., second alloy particles) by any suitable means such as stirring, shaking, rotating, folding or the like or combinations thereof. After mixing, the mixture may be combined with the binder (i.e., to form a combined powder mixture) and cast into shapes (i.e., to form a compacted preform), during and/or after which the binder can be burned off. The compacted preform may then be placed in a non-oxidizing (vacuum or inert gas) atmosphere furnace for the sintering operation, during which the powder particles of the base alloy and the second alloy undergo sintering to yield the pre-sintered preform with good structural strength and low porosity. Suitable sintering temperatures may at least in part depend on the particular compositions of the particles of the base alloy and the second alloy. For example, in some embodiments, the sintering temperature may be in a range of about 1010° C. to about 1280° C. In some embodiments, following sintering, the pre-sintered preform can be HIPed or vacuum pressed to achieve densities greater than 95%.

In some embodiments the modified component 10 may have at least one additional coating on an exterior surface 32 of the recess-shaped modification 30. The coating can comprise any type of coating that may be suitable for the modified component 10 when in operation such as those that assist in thermal, mechanical, or other performance. For example, in some embodiments, such as when the modified component 10 comprises a hot gas path component for a turbine, the coating can comprise a thermal barrier coating and/or an environmental barrier coating. Exemplary, but non-limiting coatings include one or more bond coats, transition or intermediate layers, and/or topcoats. Non-limiting materials for the coatings include ceramic materials, a notable example of which is zirconia partially or fully stabilized with yttria (YSZ) or another oxide such as magnesia, ceria, scandia and/or calcia, and optionally other oxides to reduce thermal conductivity. Bond coat materials used in thermal barrier coating systems include oxidation-resistant overlay coatings such as MCrAlX (where M is iron, cobalt and/or nickel, and X is yttrium, a rare-earth metal, and/or another reactive metal), and oxidation-resistant diffusion coatings.

The coating can be deposited to a thickness that is sufficient to provide a desired level of thermal protection for the underlying surface region such as, for example, on the order of about 75 to about 300 micrometers, though lesser and greater thicknesses are also possible. The coating 40 can be applied to the recess-shaped modification 30 (e.g., pre-sintered preform) prior to bonding the recess-shaped modification 30 to the base article 20, after bonding the recess-shaped modification 30 to the base article 20, or combinations thereof.

Referring to FIG. 2, the interior surface 31 of the recess-shaped modification 30 is disposed on the outer surface 22 of the recess 20 of the original component base 11 such that the plurality of modified cooling holes 38 of the recess-shaped modification 30 are aligned with the cooling hole outlets 28 of the original component base 11. Alignment may be achieved in a variety of methods depending in part on whether the plurality of modified cooling holes 38 were present in the recess-shaped modification 30 prior to or post disposing it in the recess 20.

For example, in embodiments where the recess-shaped modification 30 possesses a plurality of modified cooling holes 38 prior to bonding it with the modified component 10, one or more alignment pins (not illustrated) may be temporarily disposed in one of the modified cooling holes 38 and/or the cooling hole 18 of the component 10 to aid in alignment of the two pieces. For example, ceramic pins can be used to temporarily align the recess-shaped modification 30 with the original component base 11 prior to or during bonding (e.g., brazing). Such alignment pins, depending on the material, can be melted, pulled out, or otherwise removed from the modified component 10 to leave a fluidly connected cooling hole between the original component base 11 and the recess-shaped modification 30.

In other embodiments, the plurality of modified cooling holes 38 may be formed (e.g., drilled) into the recess-shaped modification 30 after the recess-shaped modification 30 is already disposed against or bonded to the original component base 11. In such embodiments, the modified cooling holes 38 can thereby be aligned with the cooling hole outlets 28 of the original component base 11 through the formation (e.g., drilling) process.

The recess-shaped modification 30 is bonded to the original component base 11 by any suitable method giving the materials such as heating. In some embodiments, such as when the recess-shaped modification 30 comprises the same alloy as the original component base 11, this may additional include weld material or the like.

In some embodiments, such as when the recess-shaped modification 30 comprises a pre-sintered preform, heating may occur within a non-oxidizing (vacuum or inert gas) atmosphere, to a temperature capable of melting the particles comprising the second alloy (i.e., the lower melting particles) of the pre-sintered preform, such as within a range of about 2050° F. to about 2336° F. (about 1120° C. to about 1280° C.) (depending on composition) for a period of about 10 to about 60 minutes. The second alloy particles can then melt and wet the particles of the base alloy and the outer surface 22 of the original component base 11 thereby creating a two-phase mixture that alloys together. Additionally, by using the combination of the base alloy and the second alloy, the pre-sintered preform may not significantly close the plurality of cooling holes 18 of the original component base 11 or the plurality of modified cooling holes 38 of the recess-shaped modification 30.

It should also be appreciated that any type of heating may be utilized such as, but not limited to, induction heating, torches, ovens or any other source to sufficiently bond the materials. In even some embodiments, the heating may be achieved through friction welding such that the heating process is more localized to the surface regions.

In some embodiments, a small amount of additional low melt constituent material can be placed between the recess-shaped modification 30 and the original component base 11 to increase brazement quality. Thereafter, the original component base 11 and the recess-shaped modification 30 can be cooled below the solidus temperature of the recess-shaped modification 30 to solidify the mixture and form the super-alloy brazement. The brazement can then undergo a heat treatment at a temperature of about 1975° F. to about 2100° F. (about 1080° C. to about 1150° C.) the one or more alloys of the recess-shaped modification with each other and/or the original component base 11. After heat treatment, any excess material in the brazement can be removed by grinding or any other suitable method.

In some embodiments, a filler material (not illustrated) may temporarily be disposed in the cooling holes 18 or modified cooling holes 18 prior to bonding the recess-shaped modification 30 to the original component base 11 to ensure the internal the cooling holes 18 and modified cooling holes 38 do not clog. Such filler material may be disposed through any suitable means and comprise any suitable material for temporarily stopping-off the passages. For example, the filler material may comprise a material that does not melt when the recess-shaped modification 30 is bonded to the original component base 11, but that can subsequently be removed via additional heating at a higher temperature, the application of select chemicals or any other suitable method. Such embodiments may be particularly suitable for smaller passages such as those with a diameter of 0.03 inches (0.762 millimeters) or less.

The resulting modified component 10 can thereby comprise a substantially unitary piece comprising both the original component base 11 having a recess 20 thereabout and a recess-shaped modification 30 disposed in and filling said recess 20. The recess-shaped modification 30 comprises a plurality of modified cooling holes 38 that align with the cooling hole outlets 28 of the component such that the a plurality of fluidly connected cooling holes are formed between the two pieces of the modified component. Thus, any portion of the original cooling hole previously located in the now present recess 20 of the base component can be replaced by the modified cooling hole 38 of the recess-shaped modification 30. This allows for a modular modification (e.g., replacement, repair or the like) of one or more cooling holes that may have been in need of modification without the need for extensive braze build up, welding or other more labor intensive methods.

Figure 3:
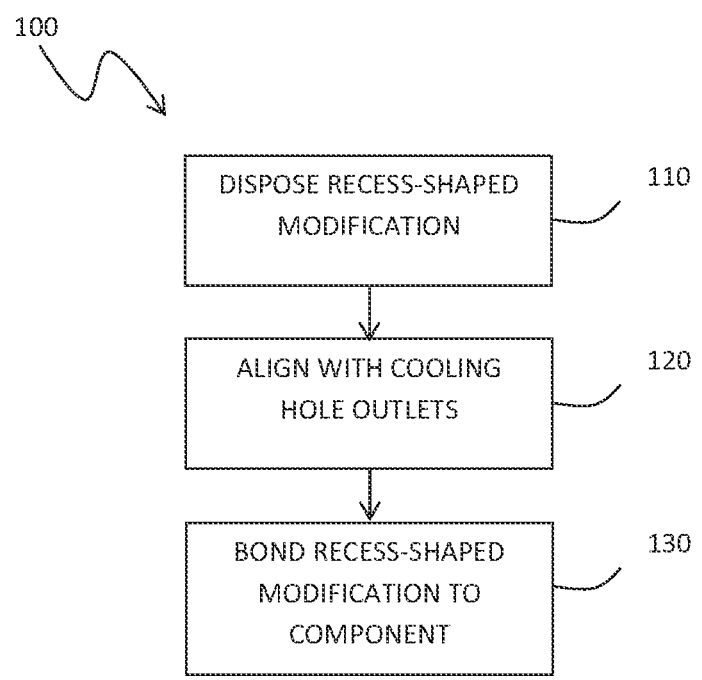
FIG. 3 is a method of modifying a plurality of cooling holes of a component according to one or more embodiments shown or described herein; and, FIG. 4 is another method of modifying a plurality of cooling holes of a component according to one or more embodiments shown or described herein.

Referring now to FIG. 3 a method 100 is illustrated for modifying a plurality of cooling holes of a component. With additional reference to the exemplary structures illustrated in FIGS. 1 and 2, the method 100 first comprises disposing a recess-shaped modification 30 in a recess 20 of the component 10 comprising a plurality of cooling hole outlets 28 in step 110. As discussed above, the recess-shaped modification 30 can already comprise a plurality of modified cooling holes 38 passing there through.

The method 100 further comprises aligning the plurality of modified cooling holes 38 (of the recess-shaped modification 30) with the plurality of cooling hole outlets 28 of the component 10 in step 120. In some embodiments, such alignment may be accomplished through the use of alignment pins as discussed above. Finally, the method 100 further comprises bonding (e.g., heating) the recess-shaped modification 30 in the recess 20 to the component 10 in step 130. The resulting bonding allows for fluid connection between the cooling holes 28 and 38.

Figure 4:
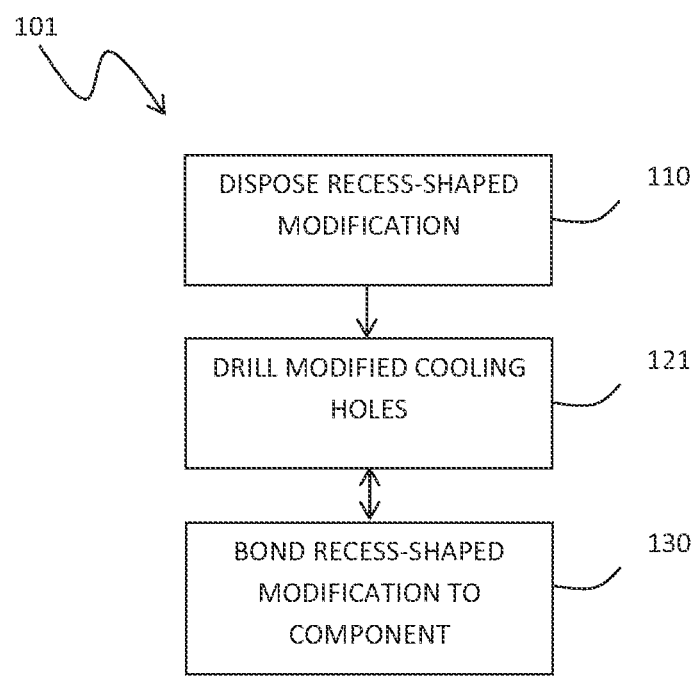

Referring now to FIG. 4 another method 101 is illustrated for modifying a plurality of cooling holes of a component. With additional reference to the exemplary structures illustrated in FIGS. 1 and 2, the method 101 first comprises disposing a recess-shaped modification 30 in a recess 20 of the component 10 comprising a plurality of cooling hole outlets 28 in step 110. As discussed above, in some embodiments, such as in method 101, the recess-shaped modification 30 can have the plurality of modified cooling holes 38 formed after it is disposed in the recess 20. The plurality of modified cooling holes 38 can thereby be formed (e.g., drilled) in step 121 and the recess-shaped modification can be bonded to the component 10 in step 130. It should be appreciated that in such embodiments, the hole formation in step 121 and bonding in step 130 can occur in any relative or simultaneous order.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method for modifying a plurality of cooling holes of a turbine component, the method comprising:
   disposing a recess-shaped modification in a recess of the component comprising a plurality of cooling hole outlets, the recess-shaped modification formed to substantially fill the recess and comprising a plurality of modified cooling holes passing there through;
   aligning each cooling hole of the plurality of modified cooling holes of the recess-shaped modification with a corresponding cooling hole outlet of the plurality of cooling hole outlets of the component;
   inserting at least one alignment pin into at least one of aligned pair of the plurality of modified cooling holes of the recess-shaped modification and the plurality of cooling hole outlets of the component;
   bonding the recess-shaped modification disposed in the recess to the component; and
   removing the at least one alignment pin from the at least one of aligned pair of the plurality of modified cooling holes of the recess-shaped modification and the plurality of cooling hole outlets of the component after bonding to fluidly connect the plurality of modified cooling holes of the recess-shaped modification aligned with the plurality of cooling hole outlets of the component.

2. The method of claim 1, wherein the turbine component comprises a turbine bucket and the plurality of cooling hole outlets are disposed at a bucket tip.

3. The method of claim 2, wherein the recess filled by the recess-shaped modification is adjacent a trailing edge of the turbine bucket.

4. The method of claim 1, wherein the recess-shaped modification comprises a pre-sintered preform, wherein the pre-sintered preform comprises a mixture comprising a base alloy and a second alloy, the base alloy comprising about 30 weight percent to about 90 weight percent of the mixture and the second alloy comprising a sufficient amount of a melting point depressant to have a lower melting temperature than the base alloy.

5. The method of claim 4, wherein the pre-sintered preform is formed by combining base alloy particles and second alloy particles with a binder to form a combined powder mixture, compacting the combined powder mixture to form a compacted preform, and heating the compacted preform to remove the binder and form the pre-sintered preform.

6. The method of claim 1 further comprising removing an outer portion of the component to form the recess prior to disposing the recess-shaped modification therein.

* * * * *